Figure 1:
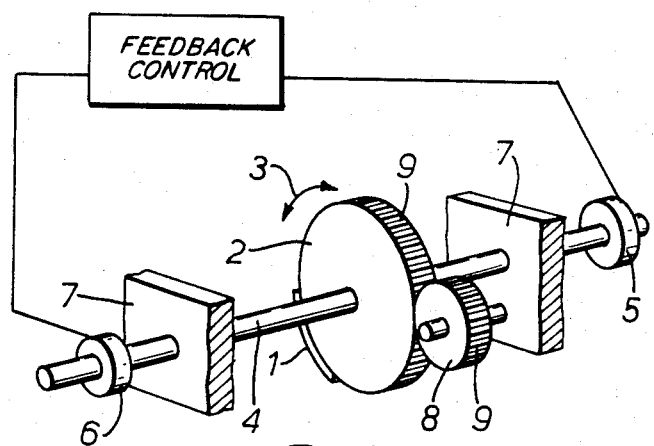

United States Patent [19]
Johnson et al.

[11] 4,105,281
[45] Aug. 8, 1978

[54] SCANNING MIRROR STABILIZER

[75] Inventors: Morris Burton Johnson, Braintree; Charles Raymond William Richardson, Chelmsford, both of England

[73] Assignee: The Marconi Company Limited, England

[21] Appl. No.: 790,956

[22] Filed: Apr. 26, 1977

[30] Foreign Application Priority Data

May 7, 1976 [GB] United Kingdom ............... 18745/76

[51] Int. Cl.² ............................................. G02B 27/17
[52] U.S. Cl. ........................................ 350/6.5; 350/16
[58] Field of Search ................. 350/6, 7, 113, 115, 350/202, 273, 275, 289, 16; 358/85, 105, 139, 153, 199, 219, 285

[56] References Cited
U.S. PATENT DOCUMENTS

| | | | |
|---|---|---|---|
| 3,522,993 | 8/1970 | Gabriet | 350/16 |
| 3,552,866 | 1/1971 | Huther | 350/16 |
| 3,566,983 | 3/1971 | Weickhardt | 350/16 |
| 3,591,250 | 7/1971 | Feinstien et al. | 350/16 |
| 3,612,643 | 10/1971 | Weber | 350/16 |
| 3,619,500 | 11/1971 | Bouley | 350/16 |
| 3,729,266 | 4/1973 | Mason et al. | 350/16 |
| 3,856,409 | 12/1974 | Cindrick et al. | 350/16 |

*Primary Examiner*—John K. Corbin
*Assistant Examiner*—B. W. delos Reyes

[57] ABSTRACT

The invention provides a scanning mirror system with line of sight stabilization. In one embodiment a mirror and a balance member are mounted to rotate and the mirror is coupled by means of gear teeth to the balance member so that the inertia of the balance member tends to compensate for the inertia of the mirror. The mirror is arranged to be rotated by a drive motor and a gyro, driven at twice the mirror angle, is arranged to detect rotational movement of the mirror. The gyro is connected in a feedback control system with the drive motor in order to tend to maintain the mirror stationary when the mirror is not being driven through a desired angle by the drive motor.

6 Claims, 2 Drawing Figures

SCANNING MINOR STABILIZER

This invention relates to arrangements including mirrors, and in particular to arrangements of the kind in which a mirror which is arranged to view a volume of space reflects received energy towards an energy responsive means. Examples of such arrangements include certain television systems, infra-red sensors, laser target markers and designators.

As is well known with such arrangements, when the optical system is mounted on a non-rigid base it is desirable to apply some form of line of sight stabilisation to the mirror. One difficulty with applying such stabilisation is that in order to maintain an image still in space, the mirror, in one plane at least, must be moved through half the angle. Since the mirror will have inertia, this inertia will tend to stabilise itself in space, thereby de-stabilising the line of sight and resulting in the need to drive the mirror through half the angle of the disturbance input motion. The de-stabilising torque produced increases with frequency and requires very high bandwidth control loops to achieve adequate stabilisation.

The present invention seeks to provide improved arrangements of the kind referred to in which the above mentioned problem is mitigated.

According to this invention an arrangement of the kind referred to is provided wherein said mirror and a balance member are mounted to rotate and said mirror is coupled mechanically to said balance member whereby the inertia of said balance member tends to compensate for the inertia of said mirror.

Preferably said balance member is a rotatable mass having gear teeth meshed with gear teeth provided on a support for said mirror, whereby rotation of said support and mirror in one direction causes rotation of said balance member in the opposite direction.

Whilst gear coupling is preferred, other forms of coupling may be used, e.g. steel tapes or bands, steel wires or levers.

Preferably said mirror is provided to be rotated by a drive motor and a gyro is arranged to detect rotational movement of said mirror, said gyro being connected in a feedback control circuit with said motor in order to tend to maintain said mirror stationary.

Normally said gyro is driven from said mirror support via a two-to-one gear whereby said gyroscope is driven at twice the mirror angle.

Figure 2:
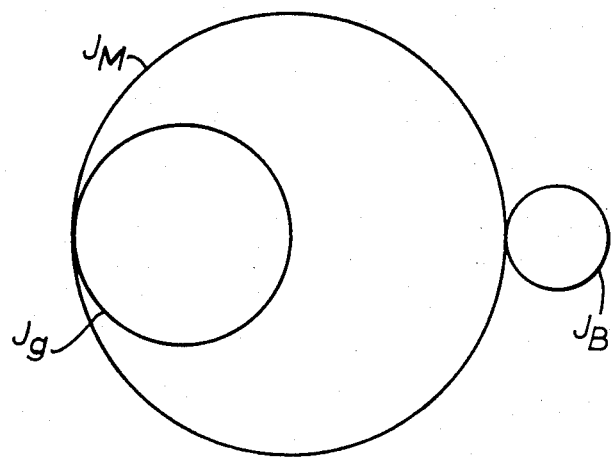

The invention is illustrated in and further described with reference to the accompanying drawing in which, FIG. 1 is a semi-schematic perspective view of a typical mirror arrangement in accordance with the present invention and FIG. 2 is an explanatory diagram.

Referring to FIG. 1, a mirror 1 mounted on a support 2 is rotatable in the directions of the double-headed arrow 3 about the axis of an axle shaft 4. The mirror 1 with its support 2 is driven by means of an electric motor represented at 5. A gyroscope 6 is provided to respond to rotation of the mirror 1 and its support 2 with respect to the case or housing of the arrangement, referenced 7.

The gyroscope is coupled to the mirror via a two-to-one gear ratio (not represented) so that it is driven at twice the mirror angle.

The gyroscope 6 is connected in a control loop circuit with the motor 5 so that when motor 5 is not being used to drive the mirror 1 through a desired angle the position of the mirror 1 relative to the casing 7 tends to be maintained constant.

Also carried by the casing 7 is a rotatable balance member 8 which is coupled to mirror support 2 to rotate in the opposite direction thereto. The coupling, in this example, between balance member 8 and mirror support 2 is accomplished by means of gear teeth 9 provided on each.

The mass of balance member 8 and the gear ratio between balance member 8 and mirror support member 2 is chosen such that the inertia of balance member 8 substantially compensates for the inertia associated with the rotation of the mirror 1.

It may be shown from consideration of FIG. 2 that the ratio of the mirror inertia to the balance member inertia is $B(1 + B)/M(1 - M)$ where B is the ratio of the rate of revolution of the balance member to the rate of revolution of the gyroscope and M is the ratio of the rate of revolution of the mirror to the same rate of revolution of the gyro.

Referring to FIG. 2, the mirror inertia is represented at $J_M$, the balance member inertia is represented at $J_B$ and the gyro inertia is represented at $J_g$.

Let Mirror r.p.m./Gyro r.p.m. = M
and Balance r.p.m./Gyro r.p.m. = B

If gyro rotates $+ \theta$ clockwise with respect to the case the mirror rotates $+ \theta M$ clockwise with respect to the case and the balance rotates $- \theta B$ clockwise with respect to the case.

If the casing rotates $+ \alpha$ clockwise and the gyro rotates $+ \theta$ with respect to the case then:

the mirror rotates $(\alpha + \theta)M$ with respect to space
the balance rotates $(\alpha - \theta)B$ with respect to space
and the gyro rotates $\alpha + \theta$ with respect to space.

The torques produced by these rotations with respect to their own axes are:

$$T_g = J_g(\ddot{\alpha} + \ddot{\theta}) \text{ clockwise}$$

$$T_M = J_M(\ddot{\alpha} + \ddot{\theta}M) \text{ clockwise and}$$

$$T_B = J_B(\ddot{\alpha} - \ddot{\theta}B) \text{ anti-clockwise}$$

where $T_g$ is the torque produced by rotation of the gyro
$T_M$ is the torque produced by rotation of the mirror
$T_B$ is the torque produced by rotation of the balance
$J_g$ is the inertia of the gyro
$J_M$ is the inertia of the mirror and
$J_B$ is the inertia of the balance. The resultant torque on the gyro =

$$J_g(\ddot{\alpha} + \ddot{\theta}) + MJ_M(\ddot{\alpha} + \ddot{\theta}M) - BJ_B(\ddot{\alpha} - \ddot{\theta}B) = [J_g + MJ_M - BJ_B]\alpha + [J_g + M^2J_M + B^2J_B]\ddot{\theta} \quad (1)$$

If the gyro is to be stationary in space one requires that $\ddot{\theta} = -\ddot{\alpha}$.

If in addition the frictional torque is small then one requires:

$$[J_g + MJ_M - BJ_B]\ddot{\alpha} - [J_g + M^2J_M + B^2J_B]\ddot{\alpha} = 0$$

or $$M(1 - M)J_M - B(1 + B)J_B = 0$$

or $$J_M/J_B = B(1 + B)/M(1 - M)$$

In one practical example, M and B were respectively 0.5 and 5 giving a ratio of mirror inertia to balance member inertia of 120. In another practical example, M and B were respectively 0.5 and 1 giving a ratio of mirror inertia to balance member inertia equal to 8.

Wherever in the present specification reference is made to "mirror inertia" or "balance member inertia" it is to be taken that what is referred to is the total inertia associated with the rotation of the member in question.

We claim:

1. A mirror arrangement including a mirror arranged to view a volume of space, said mirror being carried by a support, a balance member for said mirror, and means mounting said mirror, said support and said balance member for rotation, said balance member being a rotatable mass having gear teeth meshed with gear teeth provided on said support for said mirror such that rotation of said support and mirror in one direction causes rotation of said balance member in the opposite direction whereby the inertia of said balance member tends to compensate for the inertia of said mirror.

2. A mirror arrangement as claimed in claim 1 and wherein a drive motor is coupled to said mirror for rotating said mirror, and a gyro is coupled to said mirror for detecting rotational movement of said mirror, and a feedback control circuit connecting said gyro with said motor for tending to maintain said mirror stationary.

3. A mirror arrangement as claimed in claim 2 and wherein said gyro is driven from said mirror support via a two-to-one gear whereby said gyro is driven at twice the mirror angle.

4. A mirror arrangement including a mirror arranged to view a volume of space, said mirror being carried by a support, a balance member for said mirror, and means mounting said mirror, said support and said balance member for rotation, said balance member being a rotatable mass having a peripheral surface in driven engagement with a peripheral surface on said support for said mirror such that rotation of said support and mirror in one direction causes rotation of said balance member in the opposite direction whereby the inertia of said balance member tends to compensate for the inertia of said mirror.

5. A mirror arrangement as claimed in claim 4 and wherein a drive motor is coupled to said mirror for rotating said mirror, and a gyro is coupled to said mirror for detecting rotational movement of said mirror, and a feedback control circuit connecting said gyro with said motor for tending to maintain said mirror stationary.

6. A mirror arrangement as claimed in claim 5 and wherein said gyro is driven from said mirror support via a two-to-one gear whereby said gyro is driven at twice the mirror angle.

* * * * *

UNITED STATES PATENT AND TRADEMARK OFFICE
CERTIFICATE OF CORRECTION

PATENT NO. : 4,105,281
DATED : August 8, 1978
INVENTOR(S) : Morris Burton Johnson & Charles R.W. Richardson It is certified that error appears in the above-identified patent and that said Letters Patent are hereby corrected as shown below:

---[73] Assignee: THE MARCONI COMPANY LIMITED and
ELLIOTT BROTHERS (LONDON) LIMITED, Signed and Sealed this Thirteenth Day of March 1979

[SEAL]

Attest:

RUTH C. MASON
*Attesting Officer*

DONALD W. BANNER
*Commissioner of Patents and Trademarks*